April 17, 1934.    H. I. WARDEN    1,955,569
LICENSING OF MOTOR VEHICLES
Filed June 15, 1931
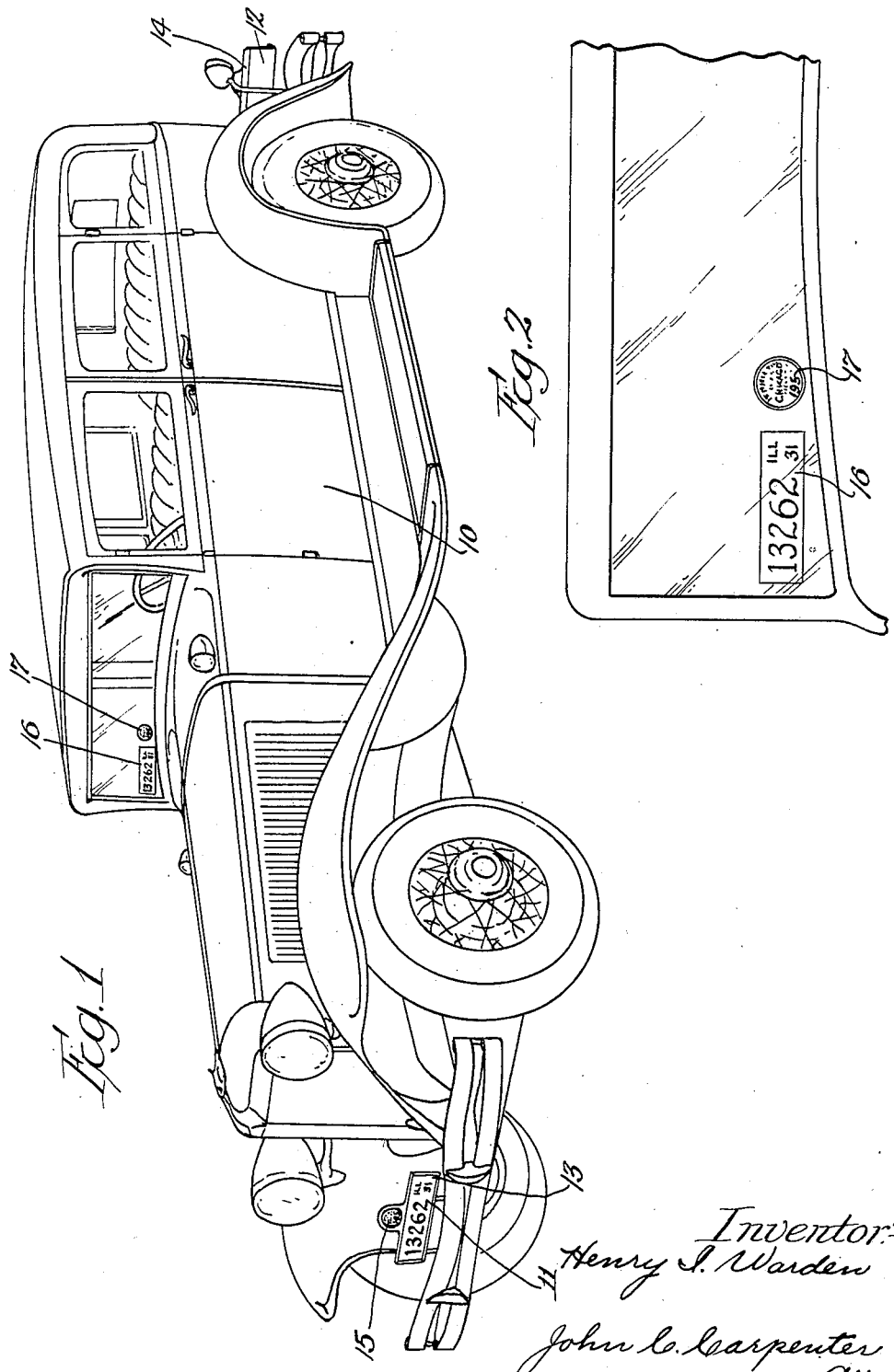

Patented Apr. 17, 1934

1,955,569

UNITED STATES PATENT OFFICE 1,955,569

LICENSING OF MOTOR VEHICLES

Henry I. Warden, St. Joseph, Mich.

Application June 15, 1931, Serial No. 544,411

4 Claims. (Cl. 40—2.2)

This invention relates to license tags for motor vehicles issued generally in accordance with State, county and municipal laws and regulations, and has for its object broadly the provision of license tags, which reason of their construction and manner of attachment to the motor vehicle substantially insure against violation of the laws and regulations governing the issuing, use, transfers and recording of license tags.

The invention contemplates, in addition to the usual metal plate or plates issued by the State, county or city, the provision of a frangible or destructible sticker, preferably in the form of a decalcomania seal, adapted to be readily fixed to the inner face of the windshield of the vehicle, which sticker or decalcomania is provided with a license number identifying it with said metal plate or plates. This sticker or decalcomania, after once being attached or sealed in usual or known manner to the windshield, cannot be removed without destruction or without leaving permanent evidence of its removal if effort be subsequently made to attach it to another and different vehicle.

The advantages of the invention are numerous and important. Its use provides ready detection of effort to disguise the theft of a car by substitution of license plates after the theft because in such event the number on the sticker or decalcomania cannot agree with the substituted metal plates.

Its use prevents, without ready detection, the temporary substitution of stolen license plates on a motor vehicle for the commission of a crime.

Its use prevents the purchaser of a used car from employing old plates in his possession without making adequate report to the governing body issuing said license plates and without paying the fees required by law.

Its use prevents, without ready detection, the employment of stolen or lost State license and city vehicle wheel tax plates in violation of regulations and without payment of required fees.

Its use provides substantial protection to purchasers of used cars against the buying of stolen vehicles, since the undamaged sticker or decalcomania provides a check of the recorded ownership of the seller.

Numerous other objects and advantages of the invention will be apparent as it is better understood from the following description which when taken in connection with the accompanying drawing illustrates a preferred embodiment thereof.

Referring to the drawing,

Figure 1 is a perspective view of an automobile equipped with license tags, in accordance with my invention; and Fig. 2 is an enlarged partial elevation of a portion of a windshield upon which the State and city stickers or decalcomania are secured.

No particular description of the vehicle, indicated by reference characters 10, will be undertaken. In accordance with prior and usual custom front and rear license tags or plates 11, 12 are detachably secured in holders 13 and 14 of usual construction. The tags or plates 11, 12 are State license tags and of course bear identical serial numbers. The holder 13 carries or may carry a city license tag or vehicle tax tag 15 bearing its own individual number.

In the embodiment of the invention shown on the drawing two sets of license tags are depicted. One of these sets is provided by the State and the other by the city for the collection of its vehicle tax. The set of tags provided by the State comprises the front and back State license plates 11, 12, bearing by way of illustration the Number 13262, and a decalcomania transfer 16 bearing the same number and secured to or transferred to the inner face of the windshield in its lower right hand corner. The set of city tags comprises the plate of disc 15, detachably carried at the front of the vehicle, and a decalcomania or sticker 17 also secured, preferably to the windshield in its lower right hand corner. The plate or disc 15 and the decalcomania or sticker 17 carry the same identifying serial number, this number being 195 on the drawing. The decalcomania or sticker is of course of delicate, frangible material, and is, or may be, conveniently provided with the usual backing sheet or support, from which it is transferred to the windshield or other glass part of the car.

It will be manifest that each set of license tags includes a member either of readily frangible character or at least of such character that it cannot be removed without its destruction or without leaving evidence of previous use if, after its removal, it is again displayed upon another and different vehicle.

The invention contemplates, but does not of necessity require, the following procedure by the State, county or city in the issuing and use of sets of license tags embodying this invention. Along with the usual metal plate or plates the sticker or decalcomania transfer will be supplied with directions requiring proper attachment of the members of the set to the car. Upon sale of the vehicle the metal plates may be required to be delivered to the proper authorities along with the usual transfer fee and a new set received by the buyer if the earlier license is to be transferred to him, otherwise the original plates may be delivered up and refund made to the seller in accordance with the law. If the metal plates are stolen or lost a new set may be issued to the owner of the vehicle after inspection by the proper authorities of the sticker or decalcomania on the car and payment of the required fee. In any event any discrepancy between the number on the decalcomania or sticker and the number of its companion metal plate or plates can be readily noted by any policeman or other peace officer and full satisfactory explanation required of the driver of the vehicle.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A set of license tags for a motor vehicle, the members of said set bearing like identifying numerals, one member of said set comprising a metal plate, adapted for detachable attachment to the motor vehicle, and a second member of said set comprising a thin readily frangible sheet, adapted to be secured to a transparent glass portion of the motor vehicle against removal without destruction.

2. A set of license tags for a motor vehicle, the members of said set bearing like identifying numerals, one member of said set comprising a metal plate, adapted for detachable attachment to the motor vehicle, and a second member of said set comprising a film, transferable from a backing sheet to a transparent glass part of the motor vehicle, adapted to be secured thereto against removal without permanent destruction of said film.

3. A license tag for a motor vehicle, comprising a frangible film, provided with identifying serial numerals, and adapted to be secured to a glass part of the motor vehicle against removal without destruction.

4. A set of license tags for a motor vehicle, the members of said set bearing like identifying serial numbers, and including sheet metal members, detachably securable to the front and back of an automobile, and a frangible film sticker, adapted to be secured to a glass part of an automobile against removal without destruction.

HENRY I. WARDEN.

DISCLAIMER 1,955,569.—*Henry I. Warden*, St. Joseph, Mich. LICENSING OF MOTOR VEHICLES.
Patent dated April 17, 1934. Disclaimer filed June 26, 1944, by the inventor.
Hereby enters this disclaimer to claim 3 of said patent.
*[Official Gazette August 1, 1944.]*